United States Patent
Liu et al.

(10) Patent No.: US 7,580,165 B2
(45) Date of Patent: Aug. 25, 2009

(54) PAPER PRESSING DEVICE

(75) Inventors: Jen-Chieh Liu, Danshuei Township, Taipei County (TW); Chun-Liang Liu, Banciao (TW)

(73) Assignee: Lite-On Technology Corporation, Taipei (TW)

( * ) Notice: Subject to any disclaimer, the term of this patent is extended or adjusted under 35 U.S.C. 154(b) by 467 days.

(21) Appl. No.: 11/489,629

(22) Filed: Jul. 20, 2006

(65) Prior Publication Data
US 2007/0223063 A1   Sep. 27, 2007

(30) Foreign Application Priority Data
Mar. 22, 2006   (TW) .............................. 95204802 U

(51) Int. Cl.
*H04N 1/04* (2006.01)
(52) U.S. Cl. ............. 358/498; 358/496; 358/474
(58) Field of Classification Search ............. 358/496, 358/498, 296, 401, 501, 488, 474; 399/367
See application file for complete search history.

(56) References Cited

U.S. PATENT DOCUMENTS

| | | | |
|---|---|---|---|
| 5,661,571 A * | 8/1997 | Ijuin et al. ............. 358/471 |
| 7,079,294 B1 * | 7/2006 | Nakagawa et al. ......... 358/496 |
| 2004/0008386 A1 * | 1/2004 | Shiraishi .................... 358/474 |
| 2007/0247676 A1 * | 10/2007 | Tsai et al. .................. 358/496 |
| 2008/0031667 A1 * | 2/2008 | Tsai et al. .................. 399/374 |
| 2008/0067736 A1 * | 3/2008 | Tsai et al. .................. 271/186 |
| 2008/0179819 A1 * | 7/2008 | Tsai et al. .................. 271/145 |

* cited by examiner

*Primary Examiner*—Cheukfan Lee
(74) *Attorney, Agent, or Firm*—Rabin & Berdo, P.C.

(57) ABSTRACT

A paper pressing device disposed on one side of a paper track of a sheet feed scanner, corresponding to a scanning module on the other side of the paper track is provided. The paper pressing device includes two pivot seats, a pressing block, and an elastic element. The two pivot seats are respectively disposed at two lateral edges of the paper track. The pressing block is located across and above the paper track, and is pivotally disposed between the two pivot seats for being rotated and slid. The elastic element, pressing against the pressing block, is used to provide a normal force to push the pressing block to move linearly and rotate. By adjusting the position and angle of the pressing block, the paper is flattened onto the scanning module.

9 Claims, 4 Drawing Sheets

PAPER PRESSING DEVICE

CROSS-REFERENCE TO RELATED APPLICATIONS

This non-provisional application claims priority under 35 U.S.C. § 119(a) on Patent Application No(s). 095204802 filed in Taiwan, R.O.C. on Mar. 22, 2006, the entire contents of which are hereby incorporated by reference.

BACKGROUND OF THE INVENTION

1. Field of the Invention

The present invention relates to a sheet feed scanner, and more particularly, to a paper pressing device for flattening the paper onto the scanning module.

2. Related Art

A general automatically sheet-feed mechanism for a multi-function peripheral (MFP) utilizes a paper track to move papers to the scanning module. To ensure the desirable quality of scanned images under the circumstance that papers are moved at a high speed, a pressing mechanism must be disposed in the MFP for pressing the papers such that they are flattened onto the surface of the transparent substrate for the scanning module, so as to achieve a stable scanning effect and desirable scanning quality.

As shown in FIG. 1, it is a schematic sectional view of a sheet feed scanner with a paper pressing device in the conventional art. The paper pressing device includes a pressing board 31 and a spring 32, wherein the pressing board 31 is pivotally connected to a pivot element 40 of the scanning device. Generally, the scanning device has a first body 10 and a second body 20, and a paper track 50 is formed therebetween for a paper to be scanned to pass through. The first body 10, an upper portion of the scanner, is provided with at least one pivot elements 40 having a pivot hole 41. The second body 20, a lower portion of the scanning device, is provided with a scanning module 21. A transparent substrate 22 is disposed above the scanning module 21, and made of transparent materials, such as glass and reinforced plastic. In the paper pressing device of a scanning device, by utilizing the elastic force provided by the spring 32, and cooperated with the pressing board 31, the spring 32 pushes the pressing board 31 to press it towards the transparent substrate 22, such that the paper to be scanned above the scanning module 21 is pressed, and being flattened onto the surface of the transparent substrate 22. Thus, a preferred optical effect is achieved when the scanning module 21 is used for scanning, so as to avoid the poor scanning quality caused by defocusing of the scanning module 21.

The shaft of the pressing board 31 is inserted into the pivot hole 41 of the pivot element 40, such that the pressing board 31 can only rotate with respect to the pivot element 40, that is, the pressing board 31 only has a moving margin with one degree of freedom. When the paper is scrolled to the scanning module 21 to be scanned, the pressing board 31 only presses the paper by way of pivotally rotating, such that the pressing effect cannot be achieved on the whole surface. As a result, the paper is partially flattened onto the surface of the transparent substrate 22; therefore, the recognition quality of the scanning module 21 is significantly reduced.

SUMMARY OF THE INVENTION

Since the paper pressing device for the sheet feed scanner in the conventional art provides a poor pressing effect, the paper cannot be flattened onto the scanning module, resulting in the problem of poor scanning quality when the scanning module scans the paper.

In view of the above problem, it is an object of the present invention to provide a paper pressing device, so as to eliminate the disadvantage of the conventional art that the paper cannot be effectively pressed on the scanning module.

The present invention provides a paper pressing device disposed in a sheet feed scanner. The scanner includes a paper track and a scanning module, wherein the paper track is used for allowing a paper to pass above the scanning module for being scanned by the scanning module, and the scanning module and the paper pressing device are respectively disposed on both sides of the paper track, corresponding to each other. The paper pressing device of the present invention includes two pivot seats, a pressing block and an elastic element. The two pivot seats are disposed on the two lateral edges of the paper track, and each has a slot being perpendicular to the moving direction of the paper. The pressing block having two shafts towards the opposite directions is used to be inserted into the slot, and the pressing surface of the pressing block is located with respect to one side of the scanning module. The elastic element presses against the pressing block, and provides a normal force to push the pressing block to move linearly and rotate.

The slot of the pivot seat is a rectangular structure, and the shaft is pivotally disposed in the slot for being rotated and slid, that is, the degree of freedom of moving margin for the pressing block is increased. When the paper to be scanned passes through the scanning module, the pressing block moves and adjusts the position and angle of the pressing surface, and meanwhile the elastic element provides a pressing force, such that the pressing block presses the whole surface of the paper. Therefore, the paper is completely flattened onto the scanning module effectively, achieving most preferred scanning quality.

The efficacy of the present invention lies in that, papers are absolutely pressed onto the scanning module of the sheet feed scanner by utilizing simple parts, so as to improve the image-scanning quality of the scanning device.

Through implementing the present invention, the following efficacies can be achieved.

1. The quality of the scanned images is effectively enhanced.
2. The structure is simple, and easy for detachment, so as to simplify the assembling procedure.
3. A uniform pressing force still can be provided after a long time use.
4. The structure is made of plastic, thus reducing the cost and the weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

The paper pressing device according to the present invention is applicable in a fax machine, Xerox machine, MFP, scanner, or other devices with the function of feeding papers. In the following detailed description of the present invention, the sheet feed scanner is taken as the preferred embodiment of the present invention. However, the accompanied drawings are provided only for reference and illustration, and are not intended to limit the present invention.

Figure 1:
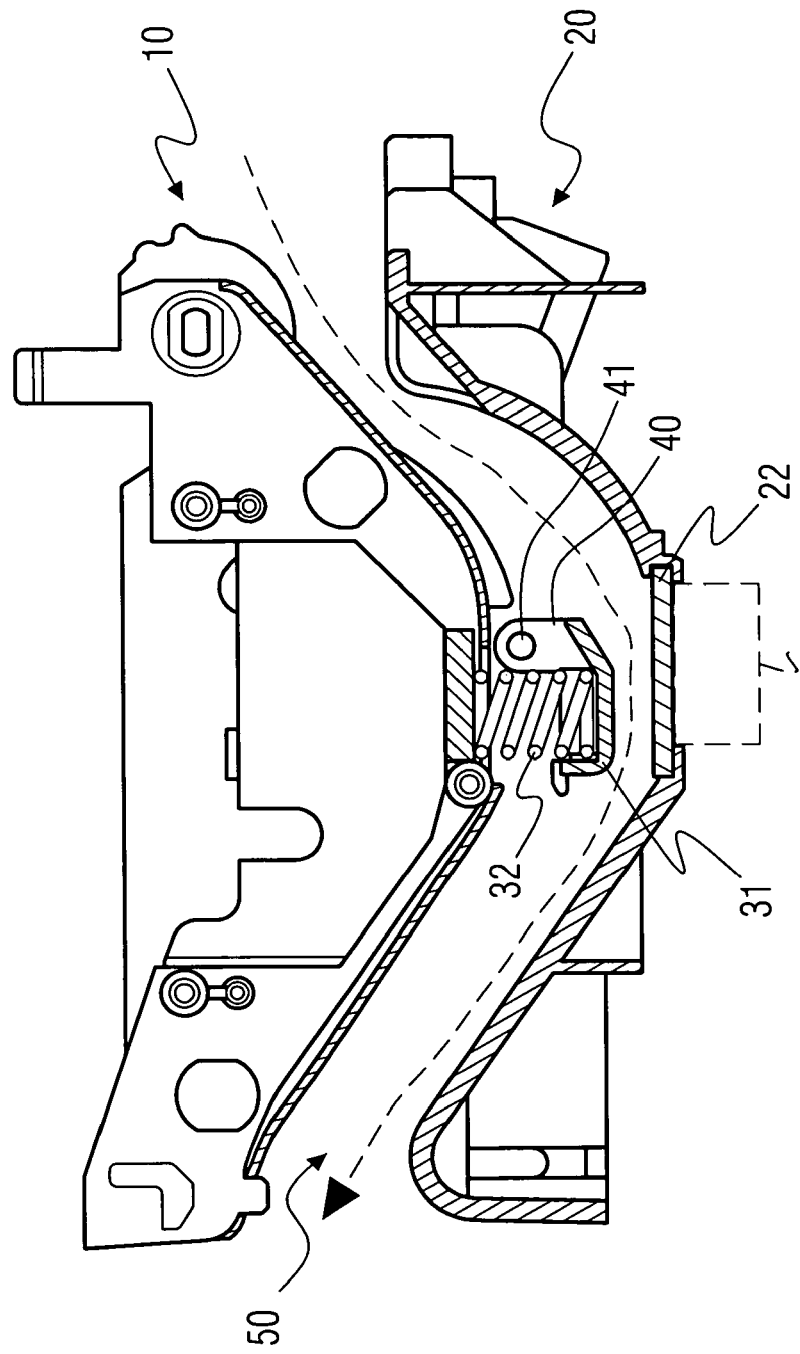
FIG. 1 is a schematic sectional view of a scanning device with a paper pressing device in the conventional art.
Figure 2:
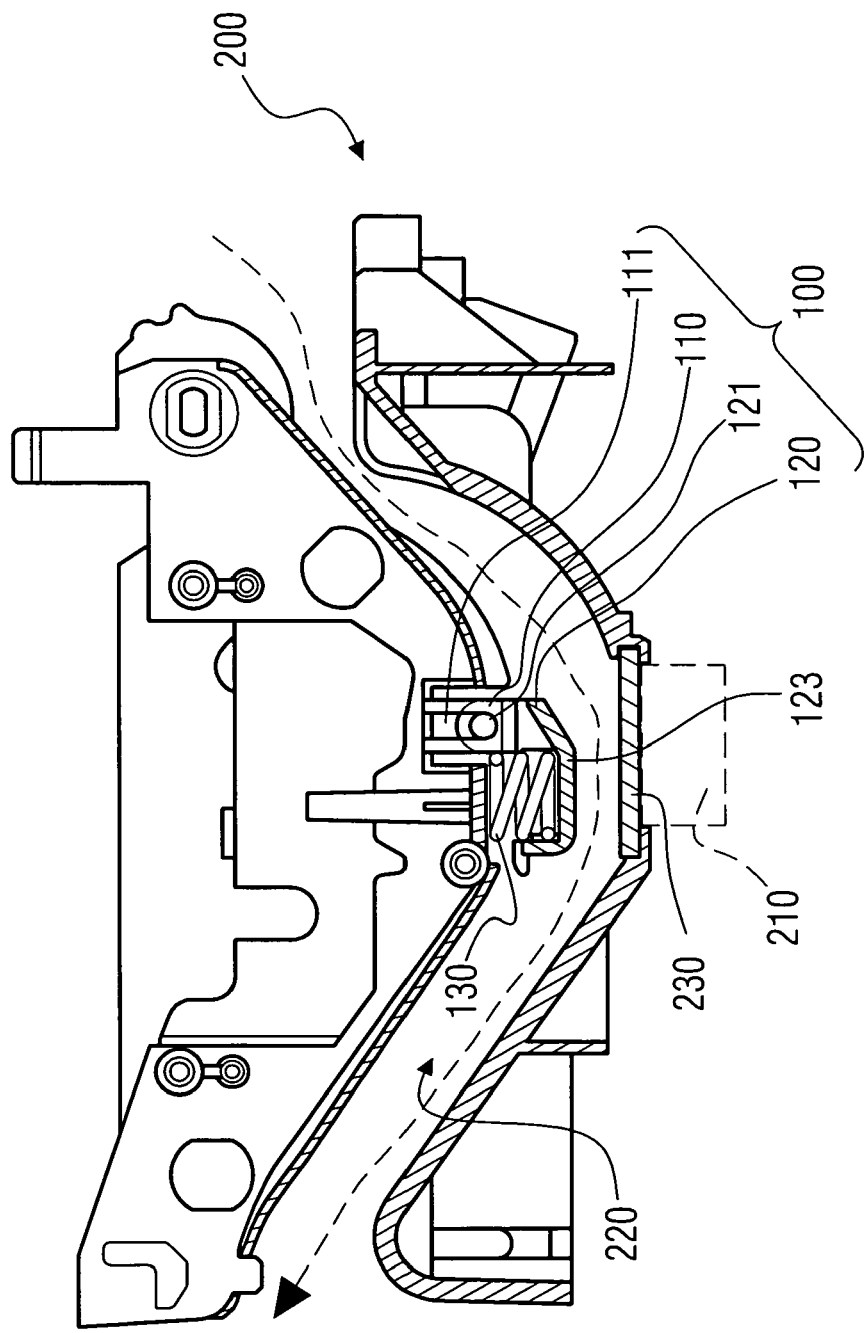
FIG. 2 is a schematic sectional view of a scanning device with a paper pressing device according to the present invention.
Figure 3:
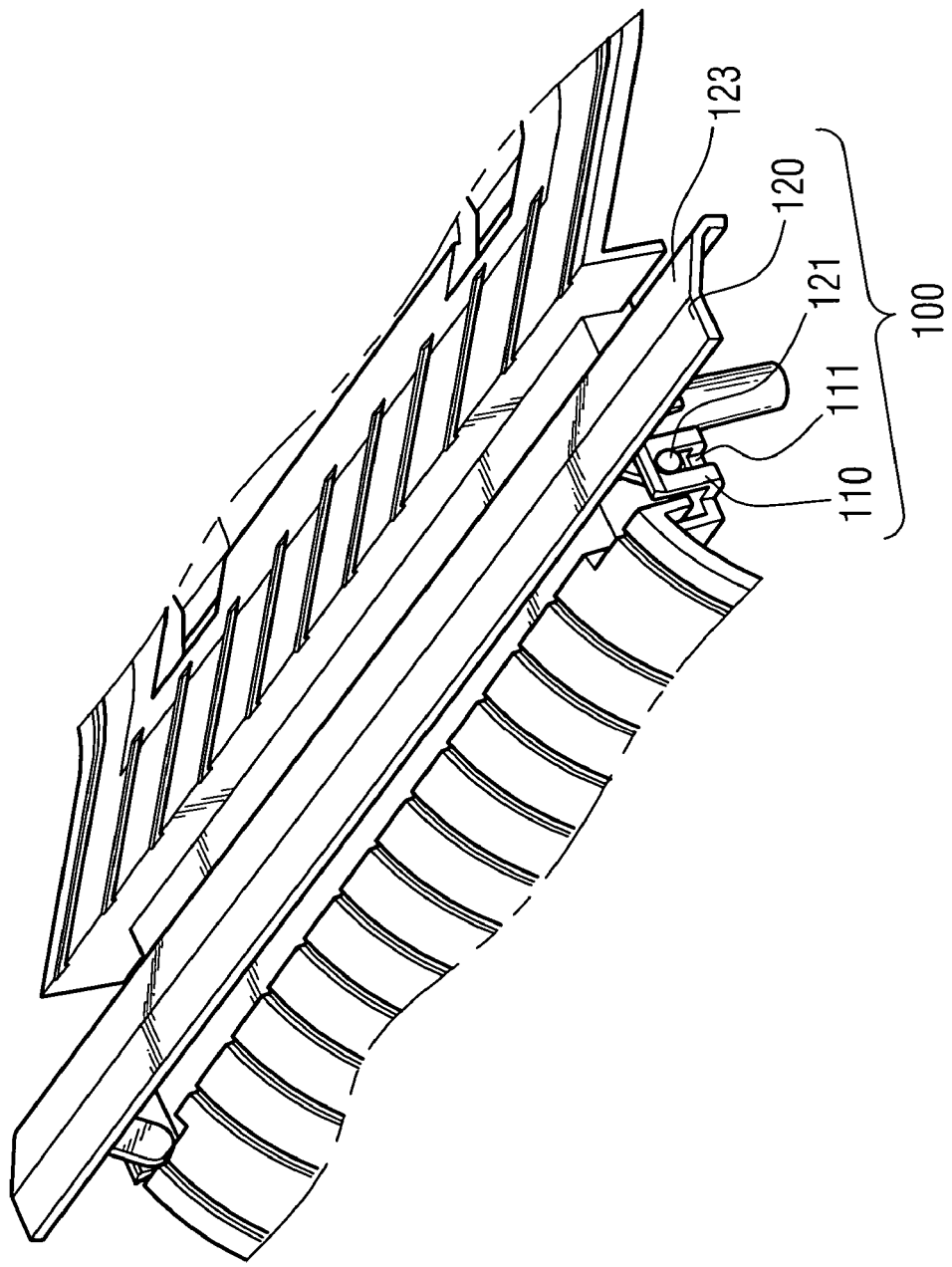
FIG. 3 is a schematic stereogram of the present invention.

FIG. 2 is a schematic sectional view of a scanning device with a paper pressing device according to the present invention, and FIG. 3 is a schematic stereogram of the present invention.

As shown in FIGS. 2 and 3, the paper pressing device 100 of the present invention is disposed in a scanning device 200. The scanning device 200 includes a scanning module 210 and a paper track 220, wherein the paper track 220 allows a paper to pass through. The paper pressing device 100 and the scanning module 210 are respectively disposed on two sides of the paper track 220, corresponding to each other, and the paper pressing device 100 are separated from the scanning module 210 by a transparent substrate 230 disposed above the scanning module 210 opposite to the other side of the paper pressing device 100.

The paper pressing device 100 includes two pivot seats 110, a pressing block 120, and an elastic element 130, wherein the two pivot seats 110 are respectively disposed on the two lateral edges of the scanning device 200, correspondingly to one side of the scanning module 210, and each of the two pivot seats 110 have a rectangular slot 111. The pressing block 120 has two shafts 121 towards the opposite directions, which are used for being inserted to the slots 111, such that the pressing block 120 is pivotally disposed between the two pivot seats 110 for being rotated and slid. Meanwhile, the pressing block 120 is located across the paper track 220, having its pressing surface corresponding to the one side of the scanning module 210, and pressing against the transparent substrate 230. The elastic element 130, such as a spring, presses against the pressing block 120, for providing a normal force to push the pressing block 120 to move linearly and rotate towards the scanning module 210 and the transparent substrate 230.

The pressing block 120 has a flat surface 123 facing the scanning module 210. The pressing block 120 is pivotally disposed on the pivot seat 110 for being rotated and slid. With the normal force of the elastic element 130, the sheet feed height between the pressing block 120 and the transparent substrate 230 can be reduced. When the paper passes through, the flat surface 123 of the pressing block 120 has a surface contact with the paper and provides a proper pressing force to press the whole paper flatly onto the transparent substrate 230, such that the paper on the scanning module 210 represents a flat state. Since the pressing block 120 has two degree of freedom of moving margins for rotating and sliding, when the paper passes through the scanning module 210, the paper can be pressed and flattened onto the transparent substrate 230 by moving and adjusting the position and angle of the pressing surface of the pressing block 120.

As shown in FIG. 3, the pivot seats 110 are respectively disposed on the two lateral edges of the scanning device 200 to make the slid of the pressing block 120 smooth toward the scanning module 210. Besides, the shafts 121 can be designed at the middle part of the pressing block 120 and the pivot seats 110 should be disposed to the position in accordance with the shafts 121 (not shown in the figures). In addition, the pressing device 100 can have only one shaft and one slot. It also performs the same function of the invention.

The pivot seat 110 is made of plastic, such that the pivot seat 110 is easy to be processed to form the slot 111. The pivot seat 110 made of plastic provides preferred elasticity margin, facilitating the shaft 121 to be pivotally connect to the slots 111. The width of the pressing surface of the pressing block 120 is equal to that of the scanning module 210 and the transparent substrate 230, or less than that of the scanning module 210, such that the paper is pressed with its whole surface. In addition, because the pivot seat 110 is made of plastic materials, the weight of the paper pressing device 100 is significantly reduced, and the manufacturing cost is also reduced. Since the plastic material is elastic, a relatively large assembling margin is provided during the assembling process.

Figure 4:
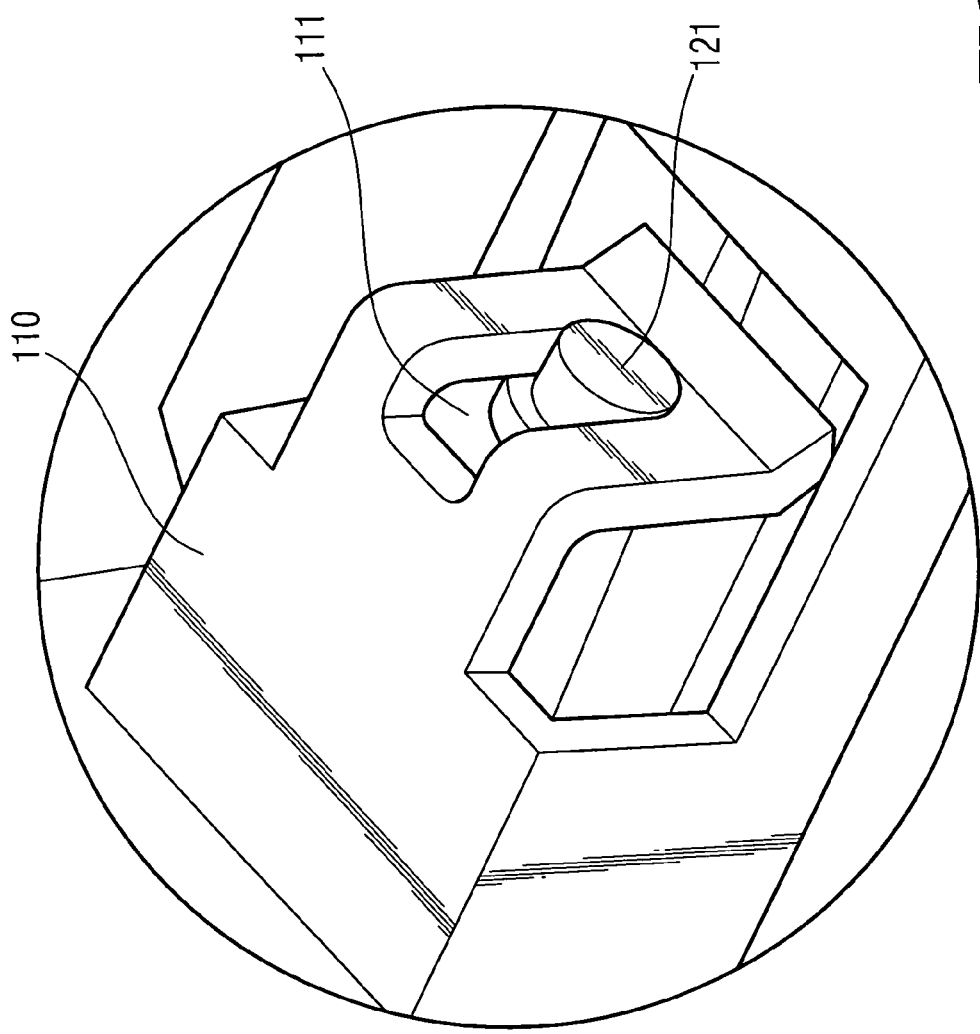
FIG. 4 is a partial schematic view of the present invention.

As shown in FIG. 4, the direction for the slot 111 of the pivot seat 110 is perpendicular to the direction for the paper to move into the scanning device, such that the pressing block 120 slides in a direction perpendicular to the moving direction of the paper. The slots 111 of the two pivot seats are located at the same axial direction, and when the pressing block 120 presses the paper, a uniform pressing force is provided to the paper, so as to achieve a stable pressing effect. The pressing block 120 can move linearly to change the distance and angle relative to the scanning module 210, such that the paper can be absolutely flattened onto the scanning module 210 effectively. Therefore, the optical properties is accurately reflected when the paper is scanned, thus improving the pressing effect of the conventional art that the paper is only partially pressed by the pressing device, and thereby achieving a preferred quality of the scanned images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A paper pressing device, disposed in a scanning device having a paper track and a scanning module, wherein the paper track is used for allowing a paper to pass through, and the paper pressing device and the scanning module are respectively disposed on two sides of the paper track, corresponding to each other, comprising:

two pivot seats, disposed on both lateral edges of the scanning device, wherein each of the two pivot seats has a slot;

a pressing block, having two shafts towards opposite directions, used for being inserted into each slot; and an elastic element, pressed against the pressing block, for providing a normal force to push the pressing block to move linearly and rotate towards the scanning module.

2. The paper pressing device according to claim 1, wherein the two pivot seats are made of plastic.

3. The paper pressing device according to claim 1, wherein the direction of the slot is perpendicular to the moving direction of the paper.

4. The paper pressing device according to claim 1, wherein a transparent substrate is disposed above the scanning module, and the pressing block presses the paper onto the transparent substrate.

5. The paper pressing device according to claim 1, wherein the elastic element is a spring.

6. A paper pressing device, disposed in a scanning device having a paper track and a scanning module, wherein the paper track is used for allowing a paper to pass through, and the paper pressing device and the scanning module are respectively disposed on two sides of the paper track, corresponding to each other, comprising:

a pressing block, pivotally disposed on the scanning device for being rotated and slid toward to the scanning module, wherein the scanning device has at least one slot, the pressing block has a least one shaft corresponding to the slot with the shaft being pivotally disposed in the slot for being rotated and slid; and an elastic element, having a force pressing the pressing block toward the scanning module, wherein when the paper passes through the paper track between the pressing block and the scanning module, the pressing block presses the paper onto the scanning module and has surface contact with the paper.

7. The paper pressing device according to claim 6, wherein the scanning device has two slots, and the pressing block has two shafts disposed on both lateral edges of the pressing block.

8. The paper pressing device according to claim 6, wherein a transparent substrate is disposed above the scanning module, and the pressing block presses the paper onto the transparent substrate.

9. The paper pressing device according to claim 6, wherein the elastic element is a spring.

\* \* \* \* \*